United States Patent
Sakashita (10) Patent No.: US 12,211,973 B2
(45) Date of Patent: Jan. 28, 2025

(54) SECONDARY BATTERY

(71) Applicant: Prime Planet Energy & Solutions, Inc., Tokyo (JP)

(72) Inventor: Yasuhiro Sakashita, Nisshin (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 548 days.

(21) Appl. No.: 17/505,837

(22) Filed: Oct. 20, 2021

(65) Prior Publication Data

US 2022/0131198 A1    Apr. 28, 2022

(30) Foreign Application Priority Data

Oct. 23, 2020  (JP) ................. 2020-177686

(51) Int. Cl.
  *H01M 10/0587*    (2010.01)

(52) U.S. Cl.
  CPC .... *H01M 10/0587* (2013.01); *H01M 2220/20* (2013.01)

(58) Field of Classification Search
  CPC ............... H01M 10/0587; H01M 2220/20
  USPC ........................................ 429/211
  See application file for complete search history.

(56) References Cited

U.S. PATENT DOCUMENTS

2020/0185762 A1*  6/2020  Okura ............... H01M 10/0525
2021/0280840 A1*  9/2021  Tanabe .................. H01M 4/70

FOREIGN PATENT DOCUMENTS

| CN | 111293268 A | 6/2020 |
| JP | 2011243527 A | 12/2011 |
| JP | 201337816 A | 2/2013 |
| JP | 2013-98026 A | 5/2013 |
| JP | 2013105623 A | 5/2013 |
| JP | 2013149388 A | 8/2013 |
| JP | 2013-218804 A | 10/2013 |
| JP | 2016207576 A | 12/2016 |
| JP | 2017-79139 A | 4/2017 |

* cited by examiner

*Primary Examiner* — Jonathan G Jelsma
*Assistant Examiner* — Omar M Kekia
(74) *Attorney, Agent, or Firm* — HAUPTMAN HAM, LLP (57) ABSTRACT

The present disclosure provides a technology for preventing detachment of a collector bundle or a collector terminal derived from collector breakage. A wound electrode body of the secondary battery disclosed herein includes: a core portion in which electrode mix layers of electrode sheets face each other; a collector wound portion resulting from winding of uncoated portions of the electrode sheets; and a collector bundle which is formed in a partial region of the collector wound portion, and to which a collector terminal is connected. Furthermore, in the wound electrode body, an elongated slit is formed running through the collector wound portion, and extending continuously so as to conform to the collector bundle, between the collector bundle and the core portion. In consequence it becomes possible to prevent large breaks such that the collector bundle or the collector terminal comes off.

7 Claims, 7 Drawing Sheets

SECONDARY BATTERY

CROSS REFERENCE TO RELATED APPLICATIONS

The present application claims priority based on Japanese Patent Application Publication No. 2020-177686 filed on Oct. 23, 2020, the entire contents whereof are incorporated in the present specification by reference.

BACKGROUND

1. Technical Field

The present disclosure relates to a secondary battery. Specifically, the present disclosure relates to a secondary battery provided with a wound electrode body and with a collector terminal connected to the wound electrode body.

2. Description of the Related Art

Secondary batteries such as lithium ion secondary batteries and nickel-metal hydride batteries are widely used nowadays in various fields such as vehicles and portable terminals. Each of such secondary batteries is provided with, for instance, a wound electrode body, a case that accommodates the wound electrode body, and an external terminal connected to an external device such as a vehicle motor. In a secondary battery having such a structure, a conductive member referred to as a collector terminals is used in order to electrically connect the external terminal exposed outside the case and the wound electrode body accommodated in the case (for instance Japanese Patent Application Publication No. 2017-79139).

Figure 9:
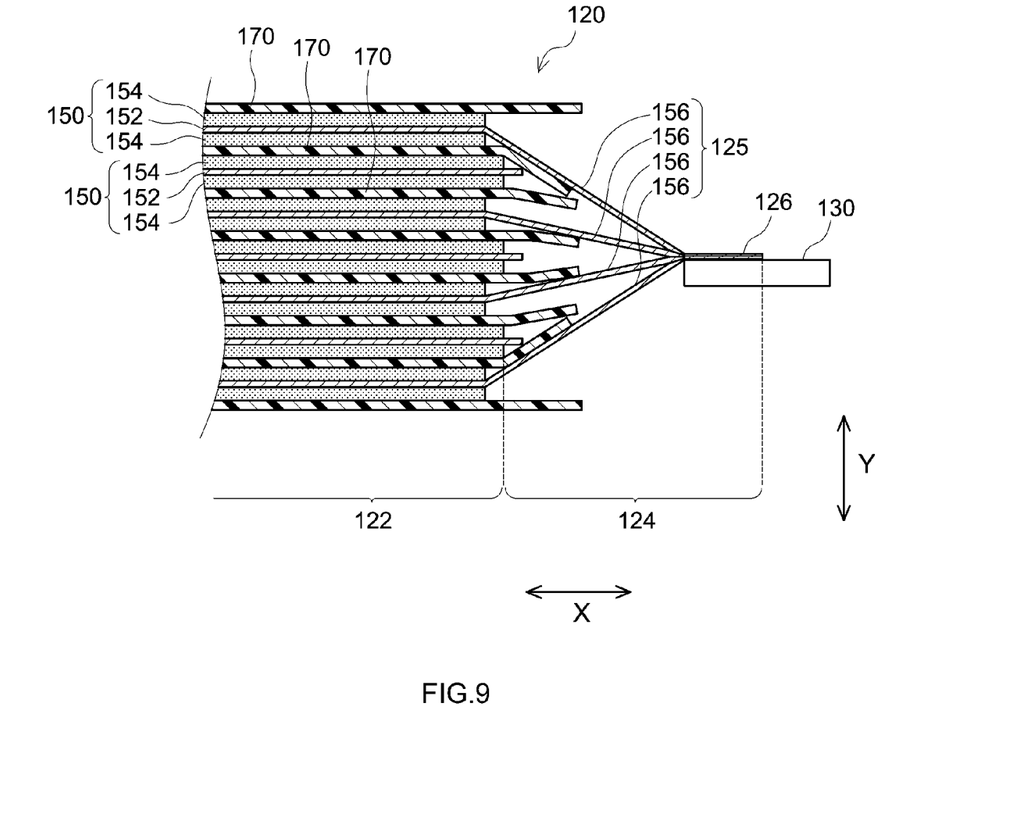
FIG. 9 is a cross-sectional diagram illustrating schematically connecting of a wound electrode body and an electrode terminal in a conventional battery.

FIG. 9 is a cross-sectional diagram illustrating an example of a structure of connecting a collector terminal and a wound electrode body in conventional art. A wound electrode body 120 illustrated in FIG. 9 is formed by winding of a pair of electrode sheets 150 each made up of a positive electrode sheet and a negative electrode sheet. Each electrode sheet 150 includes a foil-shaped collector 152 and an electrode mix layer 154 applied on the surface of the collector 152. The electrode mix layer 154 is not applied on one side edge portion of the electrode sheet 150 in a width direction X, and thus an uncoated portion 156 is formed in which the collector 152 is exposed. In the wound electrode body 120, the electrode sheets 150 are laid up and wound across separators 170 in such a manner that the uncoated portion 156 of one electrode sheet 150a protrudes beyond the side edge portion of the other electrode sheet 150b. As a result, a collector wound portion 124 is formed by winding of uncoated portions 156 (collectors 152), on a side edge portion of the wound electrode body 120 in the width direction X. Further, a core portion 122 resulting from winding of the electrode mix layers 154 is formed at the central portion of the wound electrode body 120 in the width direction X. The side edge portion of the collector wound portion 124 in the width direction X is then squashed along a depth direction Y. A collector bundle 126 is thus formed in this squashed portion. The collector bundle 126 is a portion where multiple collectors 152 are bundled and brought into close contact with each other; a collector terminal 130 is then connected to that collector bundle 126. A favorable conductive path of low electric resistance can be thus formed by connecting the collector terminal 130 to the portion where the multiple collectors 152 are in close contact with each other.

SUMMARY

When adopting the connection structure illustrated in FIG. 9, however, a defective product may be produced in which the collector bundle 126 or the collector terminal 130 detach during production of the secondary battery, and yield may thus drop. In the above connection structure, specifically, the side edge portion of the collector wound portion 124 is squashed to form the collector bundle 126, and as a result a convergence section 125 is formed between the core portion 122 and the collector bundle 126. The collectors 152 (uncoated portions 156) in the convergence section 125 are likely to be acted upon by strong tension due to gathering of the collectors. Herein a large break such that the collector bundle 126 comes off may occur, in a case where strong tension exceeding the strength of the collectors 152 is exerted during formation of the collector bundle 126. Even if the collectors 152 suffer no break during the formation of the collector bundle 126, nevertheless slight scratches that arise in subsequent steps (for instance, connection of the collector terminal 130) are likely to spread, and may therefore grow up to a large enough break such that the collector bundle 126 or the collector terminal 130 comes off.

It is a main object of the present disclosure, with a view to solving the above problem, to provide a technology for preventing detachment of a collector bundle or a collector terminal derived from collector breakage, and contribute thus to improve the manufacturing yield of a secondary battery.

To attain the above object, the technology disclosed herein provides a secondary battery having the configuration below.

The secondary battery disclosed herein includes a wound electrode body resulting from winding a pair of electrode sheets each made up of a positive electrode sheet and a negative electrode sheet, and a collector terminal connected to the wound electrode body. Each electrode sheet includes an elongated foil-shaped collector, an electrode mix layer applied on a surface of the collector, and an uncoated portion which is formed on one side edge portion in a width direction, and at which the electrode mix layer is not applied and the collector is exposed. The wound electrode body of the secondary battery includes a core portion formed at a central portion in the width direction, and wound so that the electrode mix layers of the pair of electrode sheets face each other, a collector wound portion which is formed on both side edge portions in the width direction, and at which the uncoated portion is wound in a state of protruding beyond the other of the electrode sheets, and a collector bundle which is formed in at least a partial region of the collector wound portion, and at which multiple layers of the uncoated portion are bundled and brought into close contact with each other, and to which the collector terminal is connected. In the secondary battery disclosed herein, an elongated slit is formed running through the collector wound portion and extending continuously so as to conform to the collector bundle, between the collector bundle and the core portion in the width direction.

In secondary battery having the above configuration, the elongated slit is formed between the collector bundle and the core portion. The collector bundle and the core portion are separated thus by the elongated slit. At the time of forming the collector bundle it becomes therefore possible to prevent tension from acting on the collector that is present between the collector bundle and the core portion. Therefore, the technology disclosed herein allows preventing large breaks in the collector such that the collector bundle or the collector terminal comes off, and allows contributing to increasing the manufacturing yield of the secondary battery.

In a preferred implementation of the secondary battery disclosed herein, the slit is formed at least in a region including an upper end of the collector wound portion. As a result, tension can be suitably prevented from acting on the collector that is present between the collector bundle and the core portion.

In a preferred implementation of the secondary battery disclosed herein, a ratio (L2/L1) of a length L2 of the slit relative to a length L1 of the collector bundle in a height direction is 1/4 or more and 1 or less. As a result, tension can be more suitably prevented from acting on the collector that is present between the collector bundle and the core portion, and increases in battery resistance, derived from the formation of an unnecessarily long slit, can likewise be curtailed.

In a preferred implementation of the secondary battery disclosed herein, a termination hole, which is a circular opening having a diameter larger than a width of the slit, is formed in at least one of the end portions of the slit. This allows suitably preventing breakage, in the collector, such that the slit extends from the end portion of the slit.

In a preferred implementation of the secondary battery disclosed herein, a ratio (W2/W1) of a width W2 of the collector wound portion relative to an overall width W1 of the wound electrode body is 0.04 or less. In general, reducing the width W2 of the collector wound portion (uncoated portion) results in increased space efficiency and thus in better battery performance, but on the other hand strong tension is likelier to act on the collector that is present between the collector bundle and the core portion. The secondary battery disclosed herein, by contrast, allows preventing the action itself of tension on the collector that is present between the collector bundle and the core portion. As a result, it becomes possible to suitably prevent detachment of the collector terminal or of the collector bundle, even if the width W2 of the collector wound portion is reduced for the purpose of increasing space efficiency.

DETAILED DESCRIPTION

Embodiments of the present disclosure will be explained below. Any features other than the matter specifically set forth in the present specification and that may be necessary for carrying out the present disclosure can be regarded as design matter for a person skilled in the art based on conventional techniques in the relevant technical field. That is, the present disclosure can be realized on the basis of the disclosure of the present specification and common technical knowledge in the relevant technical field. In the drawings that accompany the explanation below, members and portions that elicit identical effects are explained while denoted by identical reference numerals. The dimensional relationships (length, width, thickness and so forth) in the figures do not necessarily reflect actual dimensional relationships. The reference symbol X in the figures denotes a "width direction", the reference symbol Y denotes a "depth direction", and the reference symbol Z denotes a "height direction". These directions are defined however for convenience of explanation, and are not intended to limit the manner in which a secondary battery is arranged, during use or manufacture.

The term "secondary battery" in the present specification signifies a power storage device in general in which charge and discharge reactions occur as a result of movement of charge carriers across a pair of electrodes (positive electrode and negative electrode) via an electrolyte. Such secondary batteries include so-called storage batteries such as lithium ion secondary batteries, nickel-metal hydride batteries and nickel cadmium batteries, as well as capacitors such as electric double layer capacitors. The technology disclosed herein is not limited to a specific type of secondary battery, and can be widely used in secondary batteries in general that are provided with a wound electrode body and with a collector terminal.

1. Structure of the Secondary Battery

Figure 1:
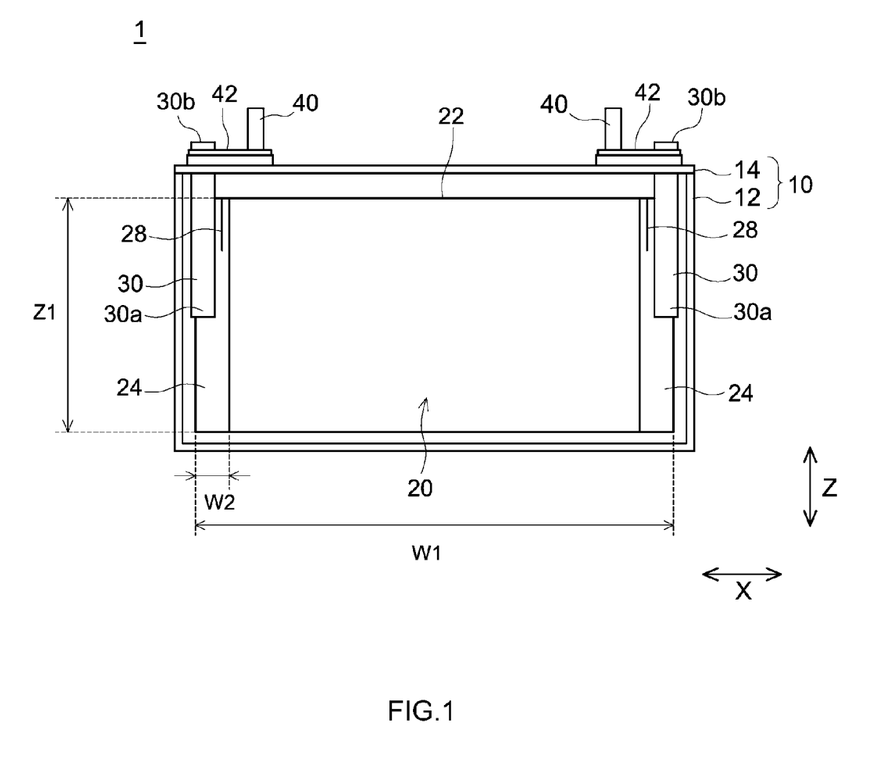
FIG. 1 is a front-view diagram illustrating schematically the internal structure of a secondary battery according to an embodiment.
Figure 2:
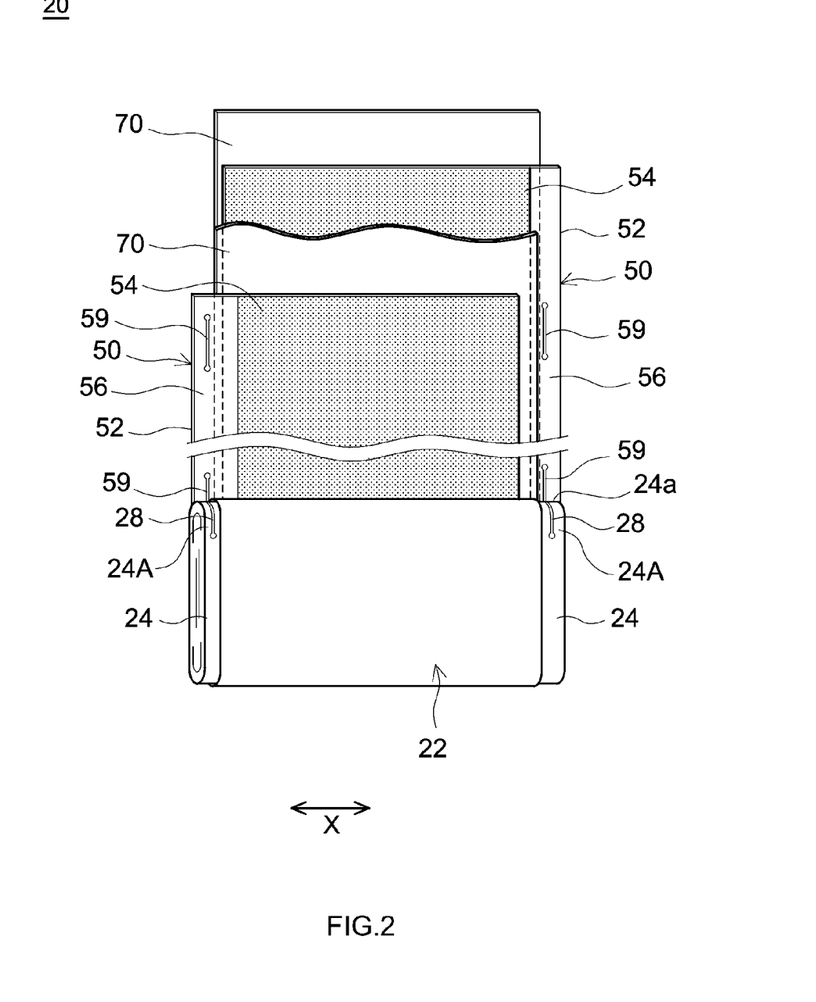
FIG. 2 is a perspective-view diagram illustrating schematically a wound electrode body in an embodiment.
Figure 3:
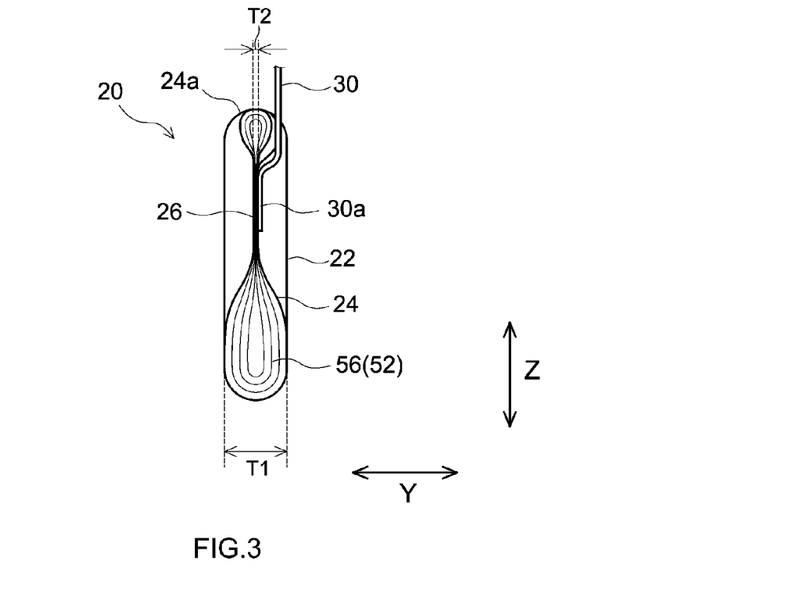
FIG. 3 is a side-view diagram illustrating schematically a connection portion of a wound electrode body and a collector terminal of a secondary battery according to an embodiment.
Figure 4:
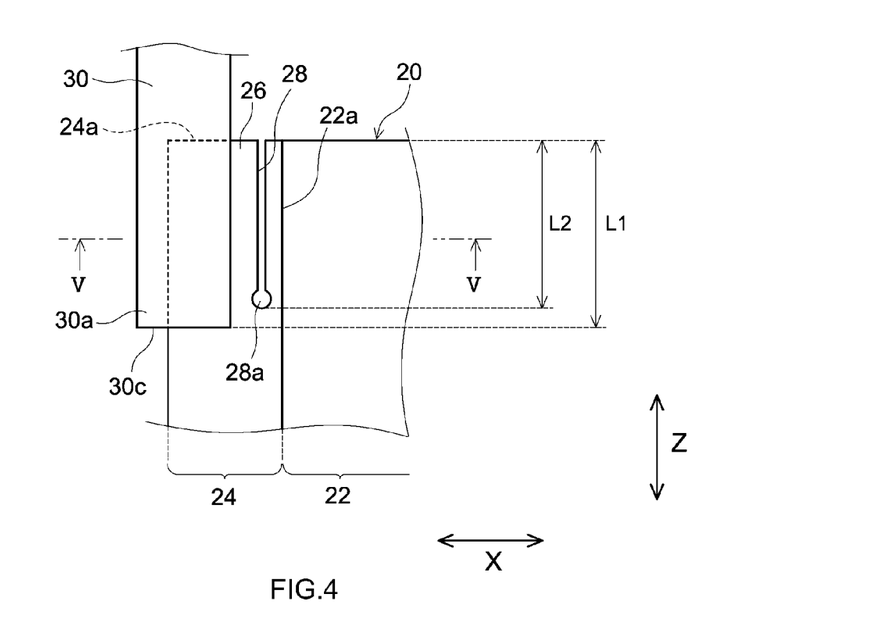
FIG. 4 is a front-view diagram illustrating schematically a connection portion of a wound electrode body and a collector terminal of a secondary battery according to an embodiment.
Figure 5:
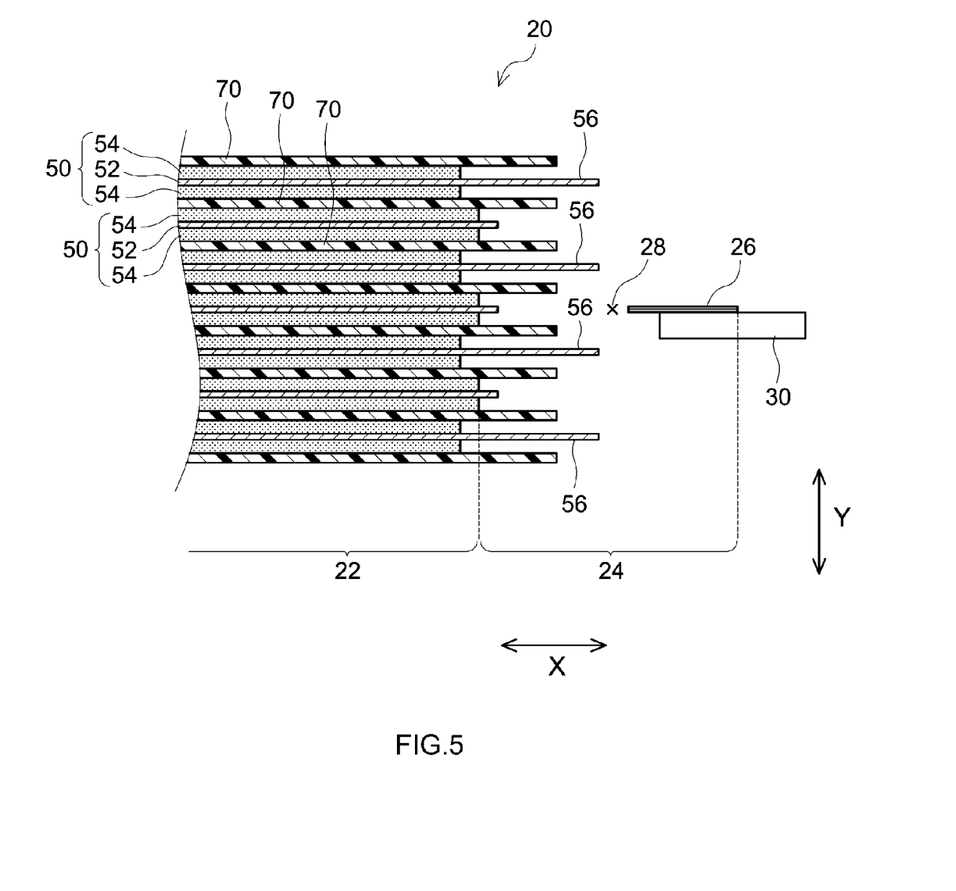
FIG. 5 is cross-sectional diagram as viewed from arrow V-V in FIG. 4.

The structure of a secondary battery according to the present embodiment will be explained hereafter with reference to FIG. 1 to FIG. 5. FIG. 1 is a front-view diagram illustrating schematically the internal structure of a secondary battery according to the present embodiment. FIG. 2 is a perspective-view diagram illustrating schematically a wound electrode body in the present embodiment. FIG. 3 is a side-view diagram illustrating schematically a connection portion of a wound electrode body and a collector terminal of the secondary battery according to the present embodiment. FIG. 4 is a front-view diagram illustrating schematically a connection portion of the wound electrode body and the collector terminals of the secondary battery according to the present embodiment. FIG. 5 is cross-sectional diagram as viewed from arrow V-V in FIG. 4.

As illustrated in FIG. 1, in a secondary battery 1 according to the present embodiment a wound electrode body 20 and an electrolyte (not shown) are accommodated inside a case 10. Further, external terminals 40 connected to an external device such as a vehicle motor are attached to the outer surface of the case 10. In the secondary battery 1 according to the present embodiment the wound electrode body 20 and each external terminal 40 are electrically connected via a respective collector terminal 30. The secondary battery 1 having such a configuration will be specifically explained next.

(1) Case

The structure of the case 10 is not particularly limited as long as the case 10 can accommodate the wound electrode body 20 and an electrolyte (not shown). For instance a flat square case 10 is used in the secondary battery 1 having the structure illustrated in FIG. 1. The case 10 includes a box-shaped case body 12 having an open top face and a lid body 14 that plugs the top face opening of the case body 12. The material of the case 10 is not particularly limited, and a material having a predetermined strength can be used herein, without limitations. Examples of the material of the case 10 include aluminum (typically an aluminum alloy).

(2) Terminal Structure

As described above, the external terminals 40 which are connection members for connecting the secondary battery 1 and an external device are attached to the outer surface of the case 10 (lid body 14). The external terminals 40 are electrically connected to the wound electrode body 20 inside the case 10 via the collector terminals 30. Specifically, each collector terminal 30 is an elongated plate-like member extending in a height direction Z. A lower end portion 30a of the collector terminal 30 is connected to the wound electrode body 20. Meanwhile, an upper end portion 30b of each collector terminal 30 runs through the case 10 (lid body 14) and is exposed outside the case 10. The upper end portion 30b of the collector terminal 30 is connected to the external terminal 40 via an external connection member 42. A width dimension (length in a width direction X) of the collector terminals 30 is preferably about 5 mm to 10 mm A sufficient connection surface area with the wound electrode body 20 can be ensured as a result.

(3) Wound Electrode Body

As illustrated in FIG. 2, the wound electrode body 20 includes a pair of electrode sheets 50 each made up of a positive electrode sheet and a negative electrode sheet. Each electrode sheet 50 of the pair thereof includes a collector 52, an electrode mix layer 54, and an uncoated portion 56. The collector 52 is an elongated foil-shaped conductive member. The thickness of the collector 52 can be set to 10 μm to 150 μm (for instance about 100 μm). Next, the electrode mix layer 54 is applied onto the surface of the collector 52. The electrode mix layer 54 contains an active material being a particulate material that stores and releases charge carriers (for instance Li ions). In addition to the active material, the electrode mix layer 54 may contain additives such as a binder and a conductive material. Next, the uncoated portion 56 is a region at which the electrode mix layer 54 is not applied and the collector 52 is thus exposed. The uncoated portion 56 is formed on one side edge portion, in the width direction X, of the electrode sheet 50. The material of each member (collector 52 and electrode mix layer 54) that makes up the electrode sheet 50 is not particularly limited, and a conventionally known material can be selected, without particular limitations, in accordance with the polarity. As an example, to construct a lithium ion secondary battery there can be used an aluminum foil as the collector on the positive electrode side, and a lithium-transition metal complex oxide (for instance a lithium-nickel-cobalt-manganese complex oxide) as an active material on the positive electrode side. Meanwhile, a copper foil can be used as the collector on the negative electrode side of the lithium ion secondary battery, and a carbon-based material (for instance carbon black) can be used as an active material on the negative electrode side.

The wound electrode body 20 in the present embodiment is produced by forming a stack in which the pair of electrode sheets 50 is laid up across a separator 70 which is an insulating sheet, followed by winding of the resulting stack. A core portion 22 resulting from winding so that the electrode mix layers 54 of the pair of electrode sheets 50 face each other becomes thus formed, as a result, at the central portion of the wound electrode body 20 in the width direction X. In the wound electrode body 20, moreover, each electrode sheet 50 is laid up so that the uncoated portion 56 of one electrode sheet 50 protrudes beyond the other electrode sheet 50, at each side edge portion in the width direction X. As a result, a respective collector wound portion 24 becomes formed in that the uncoated portion 56 of one electrode sheet 50 is wound in a state of protruding from the other electrode sheet 50, at both side edge portions of the wound electrode body 20. In the secondary battery 1 provided with the wound electrode body 20 having such a configuration, the core portion 22 at which the electrode mix layers 54 face each other constitutes a main site for charge and discharge reactions, and the collector wound portion 24 resulting from winding of the uncoated portions 56 (collectors 52) constitutes sites for connection to the respective collector terminal 30 (see FIG. 1). Although not meant to limit the technology disclosed herein, the overall width W1 of the wound electrode body 20 illustrated in FIG. 1 is preferably from 290 mm to 300 mm, and a height dimension Z1 of the wound electrode body 20 is from 90 mm to 100 mm. The maximum thickness of the wound electrode body 20 illustrated in FIG. 3 (thickness T1 of the core portion 22) is preferably from 36 mm to 39 mm (4) Connection Structure of the Wound Electrode Body and the Collector Terminals As illustrated in FIG. 3, in the wound electrode body 20 of the present embodiment collector bundles 26 are formed in at least a partial region of respective collector wound portions 24. Each collector terminal 30 is connected to a respective collector bundle 26. Specifically, each collector bundle 26 is formed through pressing of part of the respective collector wound portion 24 (typically upper end portion of the collector wound portion 24) so as to be pinched in a depth direction Y, and through squashing part of the collector wound portion 24. The wound layers of the uncoated portions 56 (collectors 52) in the collector bundle 26 are thus bundled and brought into close contact with each other. In the secondary battery 1 according to the present embodiment each collector bundle 26 and the lower end portion 30a of the respective collector terminal 30 are connected in a state of surface contact therebetween. Thus a conductive path of superior conductivity (little electric resistance) can be formed through connection of the collector terminal 30 to the collector bundle 26 in which multiple layers of the collectors 52 are brought into close contact with each other. The means for connecting the collector bundle 26 and the collector terminal 30 to each other is not particularly limited, and a conventionally known connection means can be resorted to herein without particular limitations. Examples of such connecting means include ultrasonic bonding, laser welding and resistance welding.

As illustrated in FIG. 4, an elongated slit 28 running through the respective collector wound portion 24 becomes formed, in the secondary battery 1 according to the present embodiment, between each collector bundle 26 and the core portion 22, in the width direction X. Each slit 28 is formed continuously so as to conform to a respective collector bundle 26, in the height direction Z. For instance, the slit 28 illustrated in FIG. 4 extends in the height direction Z so as to be substantially parallel to a respective collector bundle 26. In the wound electrode body 20 having such a configuration, regions of the collector wound portions 24 positioned outward of the slits 28 are separated from the core portion 22, as illustrated in FIG. 4 and FIG. 5. As a result, strong tension that may occur at the time of the formation of a conventional convergence section 125 (see FIG. 9) does not arise in a case where the collector bundles 26 are formed through squashing of a region, of the collector wound portions 24, separated from the core portion 22, as illustrated in FIG. 5. Therefore, the secondary battery 1 according to the present embodiment allows preventing detachment of the collector bundles 26 or the collector terminals 30 derived from breakage of the uncoated portions 56 (collectors 52) present between the core portion 22 and the collector bundles 26, and accordingly allows contributing to improving the yield of the secondary battery in the production process.

A length L2 (see FIG. 4) of each slit 28 in the height direction Z is not particularly limited, and can be appropriately modified in accordance with the dimensions of the wound electrode body 20 and of the collector terminals 30. For instance a ratio (L2/L1) of the length L2 of the slit 28 relative to the length L1 of the collector bundle 26 is preferably 1/4 or higher. By forming such a slit 28 of sufficient length it becomes possible to suitably prevent strong tension from acting on the collectors 52 between the collector bundle 26 and the core portion 22. In the collector wound portions 24 of the secondary battery 1 according to the present embodiment, on the other hand, battery resistance may increase if the length L2 of the slit 28 is made longer than necessary, since current flows so as to wrap around the slits 28. From this point of view, the above ratio L2/L1 is preferably 1 or lower, more preferably 1/2 or lower. A concrete length L2 of the slit 28 is preferably from 50 mm to 100 mm. As illustrated in FIG. 4, the term "length L1 of the collector bundle 26" in the present specification denotes a height dimension from an upper end 24a of each collector wound portion 24 to the lower end 30c of the respective collector terminal 30.

As illustrated in FIG. 4, each slit 28 in the present embodiment is formed at a region that includes the upper end 24a of a respective collector wound portion 24. As a result, all collector bundles 26 at the upper end portion in the height direction Z are separated from the core portion 22, and accordingly it becomes possible to reliably prevent a large tension from acting on the collectors 52 that are present between each collector bundle 26 and the core portion 22. Further, the distance from a side edge 22a of the core portion 22 up to the slit 28 is preferably from about 1 mm to 2 mm Damage to the electrode mix layers 54 at the time of formation of the slit 28 can be properly prevented by providing thus a certain spacing between the side edge 22a of the core portion 22 and the slit 28.

A circular opening (termination hole 28a) having a diameter larger than the width of the slits 28 is formed at an end of each slit 28 in the present embodiment. For instance the collectors 52 may break, so that the slit 28 accordingly extends, in a case where stress concentrates at the end of the slit 28 when an external force such as vibration acts on the collector wound portion 24. When by contrast the termination hole 28a such as that described above is formed, stress acting on the end portion of the slit 28 can be dispersed, and accordingly the collectors 52 can be prevented from breaking so that the slit 28 extends. In a case specifically where the width of the slit 28 is from 1 mm to 2.5 mm, the diameter of the termination hole 28a is preferably from about 2 mm to 5 mm, and more preferably from about 3 mm to 5 mm (5) Volume of a Charge/Discharge Region The secondary battery 1 according to the present embodiment is also advantageous in that the volume of the electrode mix layers 54 can be easily increased. Specifically, increasing the volume of the electrode mix layers included in the wound electrode body allows increasing the space efficiency of the secondary battery (i.e. the volume ratio of the charge/discharge region relative to the space in the case), and in consequence allows improving battery performance for instance in terms of battery capacity. When a wound electrode body having an increased volume of the electrode mix layers is used, however, a problem arises in that detachment of the collector bundle or the collector terminal is likely to occur due to the collector breakage. In the secondary battery 1 according to the present embodiment, by contrast, detachment of the collector bundles 26 or of the collector terminals 30 can be suitably prevented even when using a wound electrode body 20 having large-volume electrode mix layers 54. The above will be explained specifically below.

Means for increasing the space efficiency of the secondary battery include means that involve increasing the width of the core portion (coated region of the electrode mix layer), which is the charge/discharge region, and reducing the width of the collector wound portions (uncoated portions). When using however such a wound electrode body having narrow collector wound portions, it is necessary to gather the collectors under very strong tension in order to form collector bundles of sufficient width so as to allow for connection of the collector terminals. As a result, the collectors break readily, and hence the collector bundles and the collector terminals may detach frequently, giving rise to a significant drop in yield. In the secondary battery 1 according to the present embodiment, by contrast, the core portion 22 and the collector bundles 26 are separated by the slits 28, and hence collector bundles 26 of sufficient width can be formed, without strong tension acting on the collectors 52 between the core portion 22 and the collector bundle 26, even if the width W2 of the collector wound portions 24 is reduced. As an example, it is deemed that the collector bundles or the collector terminals detach frequently when the ratio of the width of the collector wound portions relative to the overall width of the wound electrode body is lower than 0.1. In the secondary battery 1 according to the present embodiment, by contrast, the collector bundles 26 and the collector terminals 30 can be suitably prevented from coming off even when a ratio (W2/W1) of the width W2 of the collector wound portions 24 relative to the overall width W1 of the wound electrode body 20 is 0.04 or lower. That is, the present embodiment allows producing a secondary battery 1 of high space efficiency and superior battery performance, without incurring drops in yield. A concrete dimension of the of the width W2 of the collector wound portions 24 in the present embodiment is appropriately from about 5 mm to 10 mm.

Other means for increasing the space efficiency of the secondary battery include means that involve increasing the thickness of the electrode mix layers and means that involve increasing the number of times that the electrode sheets are wound. Also in cases where the thickness of the core portion is increased by relying on these means, however, strong tension acts readily on the collectors between the core portion and the collector bundles, and accordingly a drop in yield is likely to occur on account of detachment of the collector bundle or the collector terminal. In the secondary battery 1 according to the present embodiment, by contrast, the core portion 22 and the collector bundles 26 are separated by the slits 28. As a result, it is possible to prevent strong tension from acting on the collectors 52 between the core portion 22 and each collector bundle 26, even when the thickness T1 of the core portion 22 is large. As an example, it is deemed that when in conventional secondary batteries a ratio of the thickness of the collector bundles relative to the thickness of the core portion is lower than 1/5, the collector bundles and the collector terminal start to detach, and that the frequency of detachment of the collector bundle or of the collector terminal increases significantly when the above ratio is below 1/10. In the secondary battery 1 according to the present embodiment, by contrast, the collector bundles 26 or the collector terminals 30 can be suitably prevented from detaching even when a ratio (T2/T1) of the thickness T2 of the collector bundles 26 relative to the thickness T1 of the core portion 22 is 1/5 or less (preferably 1/10 or less).

2. Method for Producing the Secondary Battery

Figure 6:
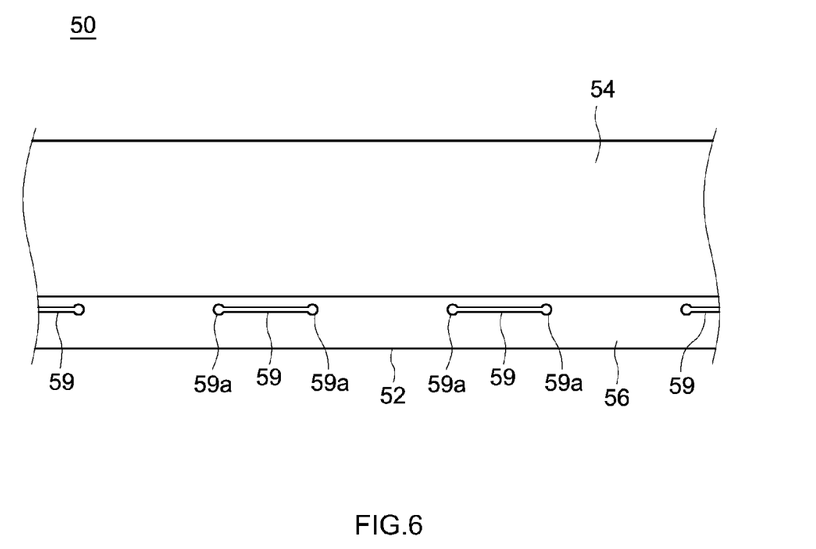
FIG. 6 is a plan-view diagram schematically illustrating an electrode sheet used in the production of a wound electrode body in an embodiment.
Figure 7:
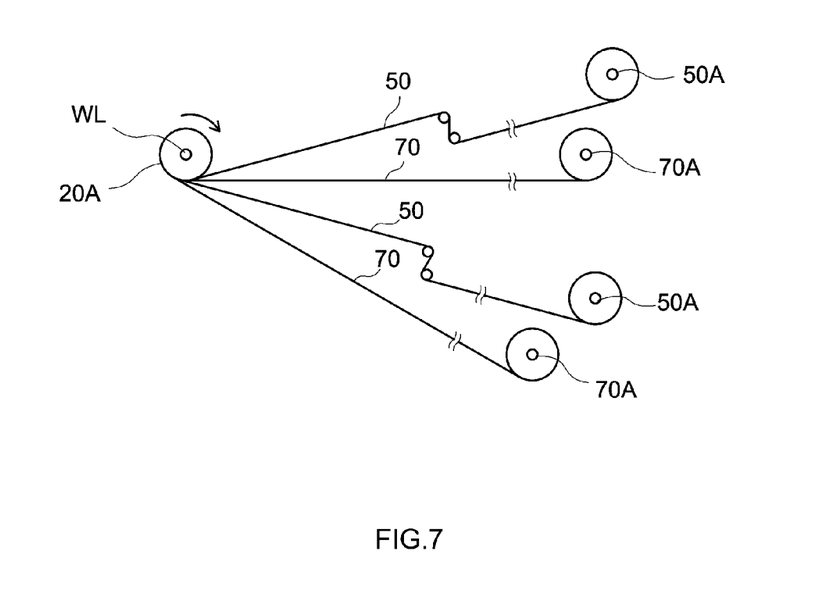
FIG. 7 is a side-view diagram for explaining the production of a wound electrode body in an embodiment.
Figure 8:
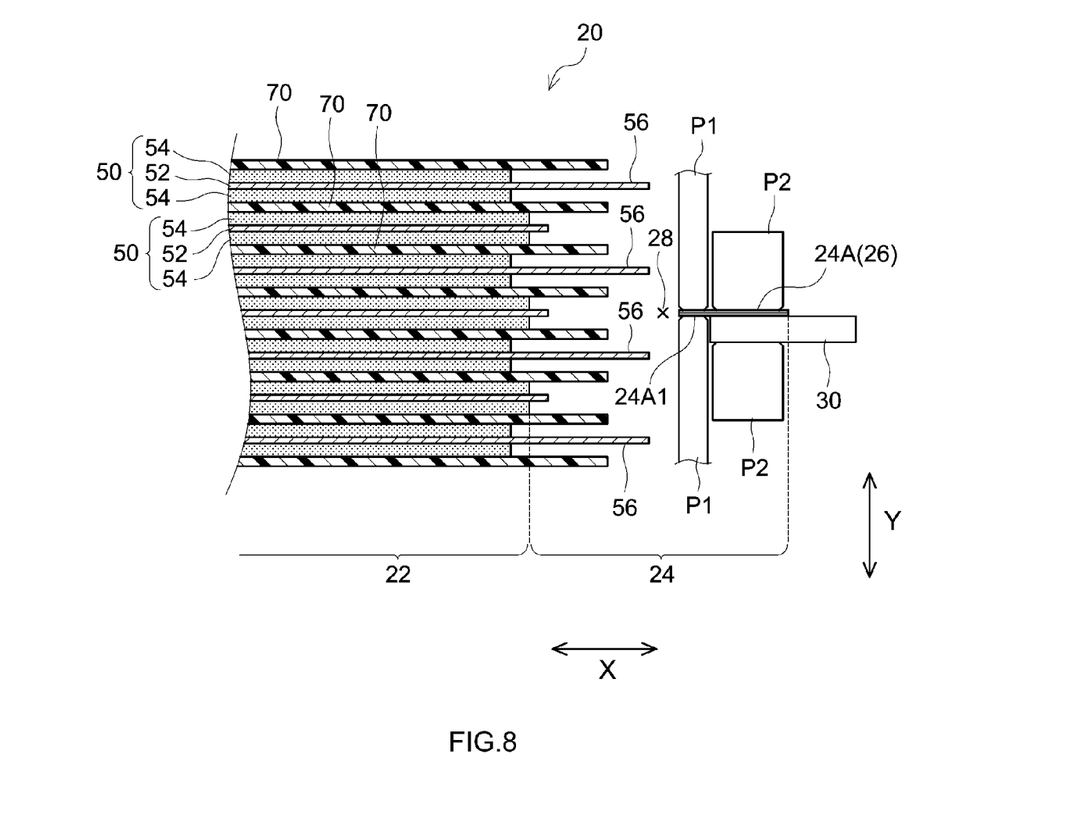
FIG. 8 is a cross-sectional diagram for explaining connecting of a wound electrode body and a collector terminal in an embodiment.

The structure of the secondary battery 1 according to the present embodiment has been explained above. An example of a method for producing the secondary battery 1 having such a structure will be described next with reference to accompanying drawings. FIG. 6 is a plan-view diagram schematically illustrating an electrode sheet used in the production of a wound electrode body of the present embodiment. FIG. 7 is a side-view diagram for explaining the production of a wound electrode body in the present embodiment. FIG. 8 is a cross-sectional diagram for explaining connecting of a wound electrode body and a collector terminal in the present embodiment. The secondary battery disclosed herein is not limited to a secondary battery produced in accordance with the below-described production method.

As illustrated in FIG. 6, in the production method according to the present embodiment firstly each electrode sheet 50, which is a constituent member of the wound electrode body, is prepared, and then there are formed a plurality of elongated openings 59 extending in the longitudinal direction of the electrode sheet 50, at each uncoated portion 56 of the electrode sheet 50. In the present embodiment circular holes 59a are created at this time at both ends of the elongated openings 59. In the winding of the electrode sheet 50 described below, the intervals between the plurality of openings 59 are appropriately adjusted so that the openings 59 are stacked at a respective same position. The means for forming the openings 59 is not particularly limited, and means such as punching, cutting or laser melting can be resorted to without particular limitations.

In the production method according to the present embodiment, a pair of electrode sheets 50 is next laid up and wound, as illustrated in FIG. 7. As a concrete procedure of that step, firstly there are prepared electrode supply units 50A around which only a respective electrode sheet 50 is wound, and separator supply units 70A around which only a respective separator 70 is wound. Then each electrode sheet 50 is paid out from the respective electrode supply unit 50A, each separator 70 is paid out from the respective separator supply unit 70A, and the tips of the electrode sheets 50 and of the separators 70 are attached to a cylindrical winding shaft WL. When the winding shaft WL is caused to rotate in this state, the electrode sheets 50 of the pair thereof become wound while being laid up on each other via the separators 70. A cylindrical wound body 20A is formed as a result on the outer periphery of the winding shaft WL. At this time the slits 28 running through respective collector wound portions 24 become formed (see FIG. 2) by virtue of the fact that the openings 59 of the respective electrode sheets 50 are stacked at a respective same position. The cylindrical wound body 20A is then squashed in such a manner that the slits 28 are folded back at the upper ends 24a of the collector wound portions 24, to produce a flat wound electrode body 20. As a result, respective elongated slits 28 extending in the height direction Z are formed in a region that includes the upper ends 24a of the collector wound portions 24, such that respective collector wound portion 24A positioned outward of the slits 28 are separated from the core portion 22. In the present embodiment the circular holes 59a formed at both ends of the openings 59 are stacked at a respective same position, and as a result the termination holes 28a are formed at both end regions of the slit 28.

In the production method according to the present embodiment each collector wound portion 24A separated from the core portion 22 is then squashed to thereby form a respective collector bundle 26, as illustrated in FIG. 8, whereupon the respective collector terminal 30 is connected to the collector bundle 26. As a concrete procedure, firstly a region 24A1 adjacent to the slit 28, in the collector wound portion 24A separated from core portion 22, is clamped between and fixed by a pair of foil pressing jigs P1. Next, the collector terminal 30 is arranged so as to be adjacent to the foil pressing jigs P1, and the collector wound portion 24A and the collector terminal 30 are brought into surface contact with each other. The collector terminal 30 and the collector wound portion 24A are then clamped between a pair of pressing jigs P2, and the collector wound portion 24A separated from the core portion 22 is squashed. As a result, there is formed a collector bundle 26 in which multiple layers of collectors 52 are bundled together. The collector terminal 30 is then connected to the collector bundle 26, to thereby elicit electrical connection between the wound electrode body 20 and the collector terminal 30. In a case where the collector bundle 26 and the collector terminal 30 are to be ultrasonically bonded, preferably a horn is built into one jig of the pair of pressing jigs P2, with the other pressing jig P2 serving as an anvil (receiving jig). The collector terminal 30 can be connected as a result while the collector bundle 26 is shaped by pressing.

As described above, in the production method according to the present embodiment the collector wound portions 24A separated from the core portion 22 are squashed to thereby form the collector bundles 26. As a result, it becomes possible to prevent strong tension from acting on the collectors 52 (uncoated portions 56) that are present between the core portion 22 and the collector bundles 26. Therefore, the production method according to the present embodiment allows preventing detachment of the collector bundles 26 or the collector terminals 30 derived from large breakage in the collectors 52, and allows contributing to increasing the production yield of the secondary battery 1.

3. Other Embodiments

One embodiment of the technology disclosed herein has been explained above. However, the above embodiment is not meant to limit the technology disclosed herein in any way. That is, the secondary battery disclosed herein can encompass various modifications to the secondary battery 1 according to the embodiment described above.

For instance, the slits 28 of the secondary battery 1 according to the embodiment described above extend in the height direction Z so as to be substantially parallel to the collector bundles 26 (see FIG. 4). However, it suffices that each slit be formed between the core portion and the respective collector bundle so as to conform to the collector bundle, and thus the slit need not be substantially parallel to the collector bundle. By setting for instance a range from 0° (parallel) about to 45° for the angle of intersection between a linear slit and a respective collector bundle, the collector bundle and the core portion can be properly separated, and large tension can be prevented from acting on the collector between the collector bundle and the core portion. Further, the slit need not extend linearly, and may extend in a curved manner, as viewed from the front, so long as the collector bundle and the core portion can be separated.

Further, each slit 28 in the embodiment described above is formed in a region that includes the upper end 24a of the respective collector wound portion 24. As a result, tension can be suitably prevented from acting on the collectors 52 that are present between each collector bundle 26 and the core portion 22, and breakage of the collectors 52 can be reliably prevented. However, the slit 28 need not be formed at the upper end 24a of the collector wound portion 24. In other words, the collector bundle 26 and the core portion 22 may be linked via the collectors 52, at the upper end 24a of the collector wound portion 24. The collectors 52 that are present at the upper end 24a of the collector wound portion 24 may break when such a configuration is adopted. Even if the collectors 52 at the upper end 24a break, however, that break does not grow into a large enough break such that the collector terminal 30 or the collector bundle 26 comes off, and hence the manufacturing yield of the secondary battery 1 is unaffected.

In the embodiment described above, moreover slits 28 are formed in respective collector wound portions 24 at both side edges of the wound electrode body 20, as illustrated in FIG. 2. However, the slit 28 may be formed in just one of the collector wound portions 24. In the embodiment described above, the termination hole 28a is formed at an end portion of each slit 28. However, such a termination hole 28a is not an essential structure. The technology disclosed herein prevents the action itself of strong tension on the collector between the collector bundle and the core portion, and accordingly breakage such that the slit extends can be sufficiently suppressed even if no termination hole is formed at an end portion of the slit. Also in a case where no termination hole is formed at an end portion of the slit, breakage such that the slit extends can be reliably prevented by attaching a protective tape or the like to the end portion of the slit.

In the production method according to the embodiment described above there are used electrode sheets 50 in which a plurality of elongated openings 59 are formed in the uncoated portion 56, such that each slit 28 is formed through stacking of the plurality of openings 59 at a same respective position (see FIG. 2 and FIG. 6). However, the means for forming the slit 28, such as that illustrated in FIG. 4, is not limited to the production method described above. For instance, each slit 28 may be formed between the core portion 22 and the respective collector bundle 26 also when the collector wound portions 24 are cut along the side edges 22a of the core portion 22 after production of the wound electrode body 20.

Concrete examples of the present disclosure have been explained in detail above, but the examples are merely illustrative in nature, and are not meant to limit the scope of the claims in any way. The art set forth in the claims encompasses various alterations and modifications of the concrete examples illustrated above.

What is claimed is:

1. A secondary battery, comprising a wound electrode body resulting from winding a pair of electrode sheets each made up of a positive electrode sheet and a negative electrode sheet, and a collector terminal connected to the wound electrode body, wherein
the electrode sheets each includes
an elongated foil-shaped collector;
an electrode mix layer applied on a surface of the collector; and
an uncoated portion which is formed on one side edge portion in a width direction, and at which the electrode mix layer is not applied and the collector is exposed,
the wound electrode body includes
a core portion formed at a central portion in the width direction, and wound so that the electrode mix layers of the pair of electrode sheets face each other;
a collector wound portion which is formed on both side edge portions in the width direction, and at which the uncoated portion is wound in a state of protruding beyond the other of the electrode sheets; and
a collector bundle which is formed in at least a partial region of the collector wound portion, and at which multiple layers of the uncoated portion are bundled and brought into close contact with each other, and to which the collector terminal is connected, and
wherein
an elongated slit is formed running through the collector wound portion, and extending continuously so as to conform to the collector bundle, between the collector bundle and the core portion in the width direction, and a ratio (L2/L1) of a length L2 of the slit relative to a length L1 of the collector bundle in a height direction is from 1/4 to 1.

2. The secondary battery according to claim 1, wherein the slit is formed at least in a region including an upper end of the collector wound portion.

3. The secondary battery according to claim 1, wherein a termination hole, which is a circular opening having a diameter larger than a width of the slit, is formed in at least one of end portions of the slit.

4. The secondary battery according to claim 3, wherein the width in the width direction of the slit is from 1 mm to 2.5 mm, and the diameter of the termination hole is from about 2 mm to 5 mm.

5. The secondary battery according to claim 1, wherein a ratio (W2/W1) of a width W2 of the collector wound portion relative to an overall width W1 of the wound electrode body in the width direction is greater than 0 and equal to or less than 0.04.

6. The secondary battery according to claim 1, wherein the ratio (L2/L1) of the length L2 of the slit relative to the length L1 of the collector bundle in the height direction perpendicular to the width direction is from 1/4 to 1/2.

7. The secondary battery according to claim 1, wherein the slit continuously extends from an upper end of the collector wound portion in the height direction and ends before reaching a lower end of the collector terminal.

* * * * *